Nov. 17, 1936. B. H. McCORMICK 2,061,285
EGG POACHER
Filed May 9, 1936
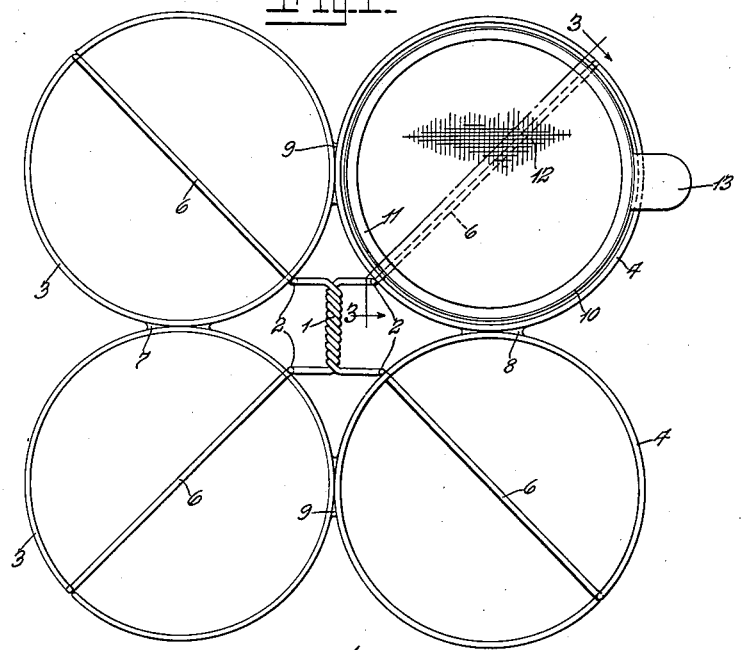
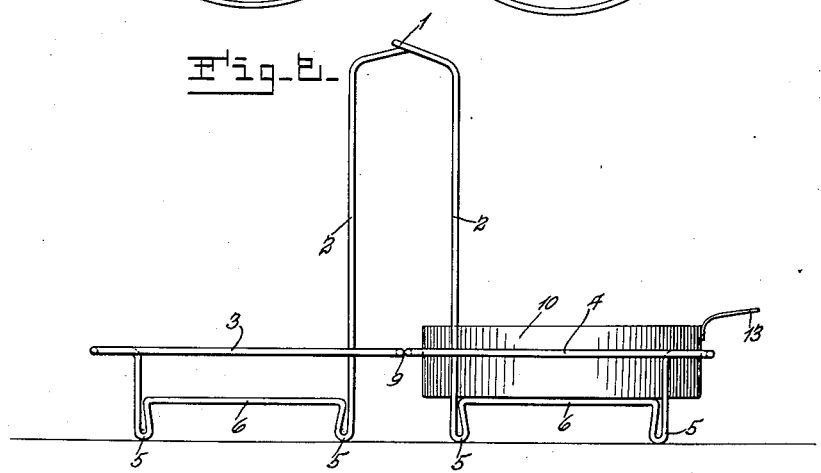
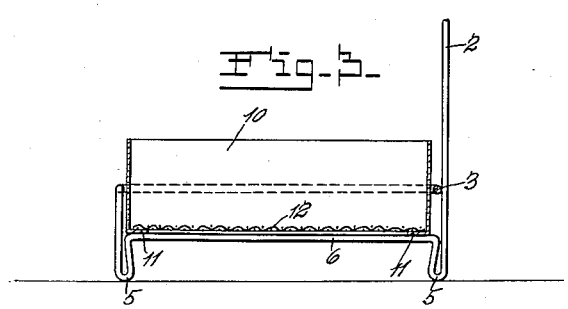
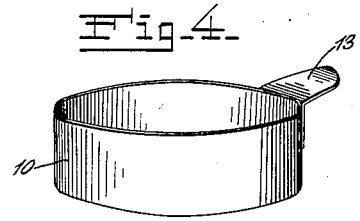
Inventor
Byrd Hays McCormick
by Rippey & Cassidy
Her Attorneys.

Patented Nov. 17, 1936

2,061,285

UNITED STATES PATENT OFFICE 2,061,285

EGG POACHER

Byrd Hays McCormick, Bismarck, Mo.

Application May 9, 1936, Serial No. 78,770

4 Claims. (Cl. 53—1)

This invention relates to egg poachers.

An object of the invention is to provide a device for use in poaching eggs including a supporting frame composed of wire or the like for holding the cups or containers in which the broken eggs are confined while the lower portion of the frame and the containers with the eggs therein are submerged in boiling water.

Another object of the invention is to provide a device for use in poaching eggs that may be manufactured and sold at low and permissible cost.

Other objects will appear from the following description, reference being made to the annexed drawing, in which—

Fig. 1 is a plan view of the supporting frame having one of the egg containers therein.

Fig. 2 is a side elevation of the device as illustrated in Fig. 1.

Fig. 3 is a vertical cross-sectional view of one of the containers mounted in the frame.

Fig. 4 is a perspective view looking into the open upper end of one of the containers.

As shown, the frame is composed of two wires twisted together to form an upwardly extended handle 1, each wire having a downwardly extended portion 2. One of the wires is further bent to form a pair of loops or rings 3 and the other wire is bent to form a pair of loops or rings 4. Further, the wires are bent to form a pair of legs 5 for each of the loops or rings, and are further bent to form raised cross portions 6 below the respective rings and a considerable distance above the lower ends of the legs 5, so that the boiling water may circulate and flow freely below the cups when they are supported in the bands or loops and on the cross members 6.

The loops or rings 3 are rigidly attached by welding or other appropriate attachment 7, and the rings 4 are likewise rigidly attached by attaching means 8. Similarly, the rings 3 are rigidly attached to the rings 4 by attaching means 9. Thus, a strong frame is provided by the simple expedient of shaping small wires to provide a handle that will extend above the boiling water, to provide supporting legs for the retaining loops or rings and attaching the loops or rings together to obtain a rigid construction.

Each container comprises an annular wall 10 having an inturned flange 11 (Fig. 3) at its lower end upon which a screen bottom 12 of fine mesh is secured. Each container may also include a laterally extended handle 13. The height of each container is greater than the vertical distance between any of the rings and their cross members 6 so that, when the containers are placed in the rings and seated upon the cross members, the upper edges of the containers are considerably above the rings (Figs. 2 and 3).

In use, the broken eggs are placed in the containers and the containers are placed in the rings and seated upon the cross members 6. Then the device is placed in boiling water of sufficient depth completely to submerge the eggs and the containers in which they are confined while the handle 1 is well above the water level. After the eggs have been poached sufficiently, the device is lifted out of the water. The eggs completely fill the containers so that practically all of the water on the eggs will flow therefrom over the upper edge of the container and substantially no water will be retained in the lower portion of the container. Thus, the eggs may be placed upon toast or the like in substantially dry condition, or at least without substantial quantities of water.

Variations in the construction of the device within the scope of equivalent limits may be made without departure from the nature and principle of the invention.

I claim:—

1. An egg poacher comprising a supporting frame composed of wire forming loops, legs for supporting the frame, cross members supported above the lower ends of said legs transversely of the loops, and containers adapted to be placed in and removed from the respective loops and to seat upon and be supported by said cross members above the lower ends of said legs and in a relationship in which the upper ends of said containers are above said loop.

2. An egg poacher comprising a wire forming rings, legs for supporting the rings, transverse members connecting said legs, and means rigidly connecting said rings; and containers for eggs insertable in and withdrawable from said rings and adapted to seat upon and be supported by said transverse members in a relationship in which the upper ends of said containers are above said rings.

3. An egg poacher comprising a wire forming rings, legs for supporting the rings, transverse members connecting said legs, and means rigidly connecting said rings; containers for eggs insertable in and withdrawable from said rings and adapted to seat upon said transverse members and be supported thereby submerged in boiling water to poach the eggs, said containers extending above said rings, and a handle in connection with said rings having a vertical height greater than the depth of the water in which the device is intended to be used.

4. An egg poacher comprising wires twisted together to provide a handle, downwardly extended portions from said handle, rings in connection with said downwardly extended portions, legs in connection with said rings for supporting said rings, transverse members in connection with said legs below said rings, means rigidly connecting adjacent rings, and containers having reticulated bottoms and adapted to contain eggs and to seat upon said transverse members and be supported thereby submerged in boiling water for poaching the eggs.

BYRD HAYS McCORMICK.